US009293038B2

(12) United States Patent
Hampapur et al.

(10) Patent No.: US 9,293,038 B2
(45) Date of Patent: *Mar. 22, 2016

(54) TRAFFIC CONTROL AGENCY DEPLOYMENT AND SIGNAL OPTIMIZATION FOR EVENT PLANNING

(71) Applicant: International Business Machines Corporation, Armonk, NY (US)

(72) Inventors: Arun Hampapur, Norwalk, CT (US); Qing He, East Amherst, NY (US); Xuan Liu, Yorktown Heights, NY (US); Songhua Xing, Staten Island, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/050,389

(22) Filed: Oct. 10, 2013

(65) Prior Publication Data

US 2015/0073687 A1    Mar. 12, 2015

Related U.S. Application Data

(63) Continuation of application No. 14/020,982, filed on Sep. 9, 2013.

(51) Int. Cl.
*G08G 1/07* (2006.01)
*G08G 1/01* (2006.01)
*G06Q 10/04* (2012.01)

(52) U.S. Cl.
CPC ............ *G08G 1/0104* (2013.01); *G06Q 10/047* (2013.01); *G08G 1/0145* (2013.01); *G08G 1/07* (2013.01)

(58) Field of Classification Search
CPC ....... G08G 1/07; G08G 1/095; G08G 1/0104; G08G 1/0145; G08G 1/20
USPC .................................................. 701/711–122
See application file for complete search history.

(56) References Cited

U.S. PATENT DOCUMENTS 3,731,271 A     5/1973   Muramatu et al.
5,917,432 A *   6/1999   Rathbone .................. G08G 1/07
                                                                340/907

(Continued)

OTHER PUBLICATIONS

U.S. Appl. No. 14/020,987; Non-Final Office Action; filed Sep. 9, 2013; Date Mailed: Sep. 17, 2014; 8 pages.

(Continued)

*Primary Examiner* — Thomas G Black
*Assistant Examiner* — Ce Li
(74) *Attorney, Agent, or Firm* — Cantor Colburn LLP; Keivan Razavi

(57) ABSTRACT

Embodiments relate to traffic control resource planning. An aspect includes receiving information about available routes in a transportation network and receiving an estimate of a traffic demand in the transportation network. Traffic control planning is performed and it may include: simulating a traffic flow based on the available routes and the traffic demand; applying a model that varies traffic control agent (TCA) placement and traffic signal settings in the transportation network to minimize a cost associated with the traffic flow, the cost including a TCA deployment cost and a traffic delay cost; and outputting a traffic control plan based on the applying, the traffic control plan including a TCA placement and traffic signal setting plan.

10 Claims, 5 Drawing Sheets

(56) References Cited

U.S. PATENT DOCUMENTS

| | | | |
|---|---|---|---|
| 6,317,686 B1* | 11/2001 | Ran | 701/533 |
| 6,427,113 B1 | 7/2002 | Rahman | |
| 6,427,114 B1* | 7/2002 | Olsson | 701/117 |
| 6,633,238 B2 | 10/2003 | Lemelson et al. | |
| 7,546,206 B1* | 6/2009 | Miller et al. | 701/415 |
| 8,040,254 B2* | 10/2011 | Delia et al. | 340/907 |
| 2003/0210156 A1 | 11/2003 | Nishimura | |
| 2010/0026520 A1 | 2/2010 | Witte et al. | |
| 2010/0171640 A1* | 7/2010 | Delia et al. | 340/907 |
| 2011/0224893 A1* | 9/2011 | Scofield | G01C 21/3492 701/119 |

OTHER PUBLICATIONS

U.S. Appl. No. 14/050,390; Non-Final Office Action, filed Oct. 10, 2013; Date Mailed: Oct. 20, 2014; 11 pages.

Behrisch et al., "Event traffic forecast for metropolitan areas based on microscopic simulation," in proceeding of: Third International Symposium of Transport Simulation 2008 (ISTS08), 2008, 10 pages.

Brown et al., Development of a Strategic Hurricane Evacuation-Dynamic Traffic Assignment Model for the Houston, Texas, Region, Transportation Research Record: Journal of the Transportation Research Board, vol. 2137, 2009, pp. 46-53.

Chung, Y. PhD Dissertation, "Development of spatio-temporal accident impact estimation model for freeway accident management," University of California, Irvine, 2007, 299 pages.

Lassacher et al., "Traffic Management of Special Events in Small Communities," Transportation Research Record: Journal of the Transportation Research Board, vol. 2099, pp. 85-93.

Latoski et al. "Managing travel for planned special events" (Publication FHWA-OP-04-010).Washington, DC: U.S. Department of Transportation, Federal Highway Administration, Sep. 2003, 448 pages.

Sheu et al., "Stochastic modeling and real-tim prediction of incident effects on surface street traffic congestion," Applied Mathematical Modelling 28, (2004), pp. 445-468.

Wojtowicz, J., "Traffic Management for Planned Special Events Using Traffic Microsimulation Modeling and Tabletop Exercises," Journal of Transportation Safety & Security, 2:102-121, 2010, 20 pages.

U.S. Appl. No. 14/020,982; Non-Final Office Action, filed Sep. 9, 2013; Date Mailed: Feb. 27, 2015; 14 pages.

U.S. Appl. No. 14/020,982; Notice of Allowance, filed Sep. 9, 2013; Date Mailed: Jul. 8, 2015; 6 pages.

U.S. Appl. No. 14/050,390; Notice of Allowance, filed Oct. 10, 2013; Date Mailed: Apr. 6, 2015; 5 pages.

U.S. Appl. No. 14/050,390; Final Office Action, filed Oct. 10, 2013; Date Mailed: Jan. 27, 2015; 6 pages.

* cited by examiner

FIG. 4

TRAFFIC CONTROL AGENCY DEPLOYMENT AND SIGNAL OPTIMIZATION FOR EVENT PLANNING

CROSS-REFERENCE TO RELATED APPLICATION

This application is a continuation of U.S. patent application Ser. No. 14/020,982, filed Sep. 9, 2013, the content of which is incorporated by reference herein in its entirety.

BACKGROUND

The present invention relates generally to event planning, and more specifically to traffic agency deployment and signal optimization for event planning.

Large scale planned events, such as sporting events and parades, attract high volumes of both pedestrians and vehicles (e.g., buses, passenger vehicles), often resulting in significant non-recurrent congestion on local transportation networks in the vicinity of the events. The local transportation networks, including the roadways used to travel to the events, are often overloaded by the additional demand as attendees simultaneously attempt to enter or exit the event. Traditionally, planning for the management of this congestion has been performed manually by individuals, such as traffic control managers, who use their past experiences to determine how to deploy traffic control agency resources in an effort to minimize bottlenecks.

Unplanned events, such as traffic incidents, severe weather, and facility problems, may also cause significant non-recurrent congestion to roadways. Non-recurrent congestion caused by unplanned events is often due to a restriction in capacity because of damaged or disabled traffic lanes or other disabled roadway infrastructures. Similar to planned events, the management of congestion caused by unplanned events is performed manually by individuals based on their past experiences.

SUMMARY

Embodiments include a method, system, and computer program product for traffic control resource planning. The method may include receiving information about available routes in a transportation network and receiving an estimate of a traffic demand in the transportation network. Traffic control planning is performed and it may include: simulating a traffic flow based on the available routes and the traffic demand; applying a model that varies traffic control agent (TCA) placement and traffic signal settings in the transportation network to minimize a cost associated with the traffic flow, the cost including a TCA deployment cost and a traffic delay cost; and outputting a traffic control plan based on the applying, the traffic control plan including a TCA placement and traffic signal setting plan.

Additional features and advantages are realized through the techniques of embodiments of the present invention. Other embodiments and aspects of embodiments of the invention are described in detail herein. For a better understanding of embodiments of the present invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of embodiments of the invention are apparent from the following detailed description taken in conjunction with the accompanying drawings in which:

FIG. 4 depicts a sample user interface that may be implemented by an embodiment.

DETAILED DESCRIPTION

Figure 1:
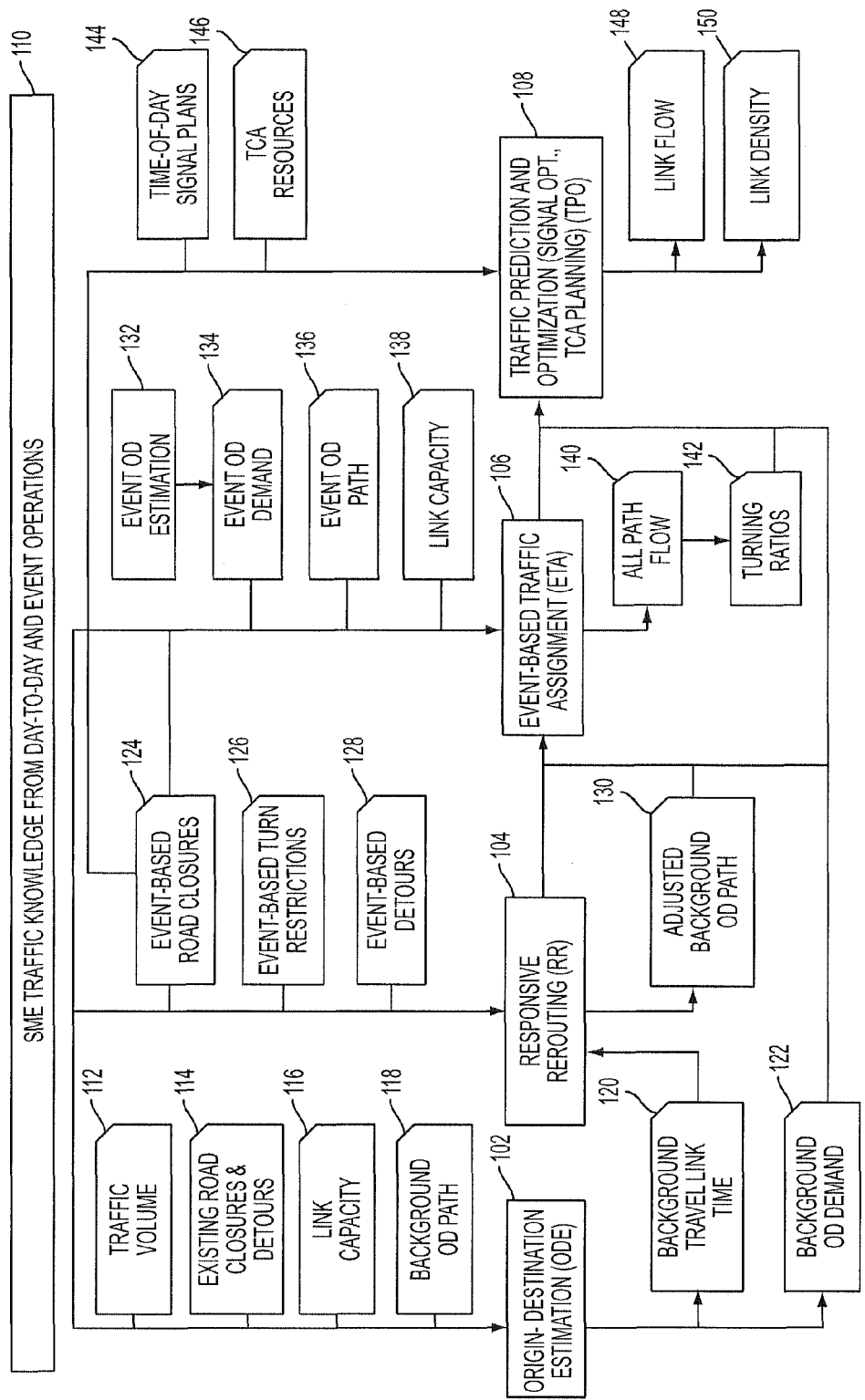
FIG. 1 depicts a framework for special event planning that may be implemented by an embodiment.

Exemplary embodiments include a traffic prediction and optimization (TPO) tool for use in traffic control agent (TCA) deployment and traffic signal optimization planning. Event planning can include plans to mitigate traffic congestion, both vehicular and pedestrian. Mitigation plans can include placement of TCAs (e.g., police officers, crossing guards) and setting traffic signals to particular settings based on expected traffic patterns (both vehicular and pedestrian). Embodiments of the TPO tool described herein are used to generate a two-level planning model for monthly and daily planning that can concurrently optimize both TCA deployment and traffic signal settings. In addition, the planning model can also be used to predict traffic queue dynamics under different event conditions. Further, the planning model can be used to mitigate traffic congestion through generating suggestions to minimize both costs due to traffic delays and costs due to TCA deployment.

Large scale special planned events (e.g., sporting events and parades) often attract high volumes of both pedestrians and vehicles. These high volumes may include significant non-recurrent congestion as well as queue spillover (e.g., traffic backed up over several blocks, gridlock). As used herein, the term "non-recurrent congestion" refers to traffic congestion caused by the occurrence of an event with characteristics of the non-recurrent congestions related to the event. This is contrasted to background traffic or recurrent congestion which occurs on a regular basis (daily, weekly). Embodiments of the TPO tool described herein can be used by a traffic operation center or other planning entity, to optimize the deployment of TCAs to mitigate traffic congestion caused by the large scale events. The tool can also be used to recommend control traffic signal settings to further mitigate the traffic congestion.

The use of traffic signal control alone is generally not adequate for managing the congestion caused by large scale events. Automated traffic signals are not "smart" nor are they adaptive enough to accommodate big surges of traffic caused by large scale events. In addition, a large volume of pedestrians can be present at events and thus the potential for vehicle-pedestrians collisions. Event based signal control cannot be used to recognize, in real-time, overall traffic conditions (e.g., including pedestrians) and can require human intervention to be changed or reset. TCAs can be deployed to increase both the safety and the mobility of event traffic. The use of live TCAs results in congestion management that is adaptive to different event scenarios. However, the typical method of deploying TCAs based on historical experience, or subject matter experts (SMEs), does not take advantage of analytical modeling as described herein in reference to embodiments.

The analytical modeling described herein is adaptable to different scenarios of events and can be used to quantify and predict a cost (e.g., of TCAs, of traffic delays) associated with different TCA deployments and traffic signal settings. Embodiments can be used to quantify the total system costs, including travel costs and TCA labor costs. In addition, the models can be validated and results used to improve future models. Embodiments of the TPO tool suggest locations for TCA manned control as well as settings for traffic signals.

TCAs can include both local TCAs physically posted at particular intersections as well as remote TCAs. Cameras can be located at intersections (or other points on a roadway) and a TCA can be monitoring the cameras from a remote location. The TCA, or other entity, can then set the traffic signals remotely based on what the TCA observes on the cameras at the remote location. In an embodiment, a computer is monitoring the cameras from the remote location instead of or in addition to a TCA.

Embodiments can be used to aid event traffic control operators in better optimizing the deployment of TCA resources to mitigate traffic congestion caused by events. Embodiments include a multiple level TCA planning mechanism for providing offline planning that includes monthly and daily planning levels, as well as online planning (e.g., for unplanned events or adjustments to offline planning). The planning mechanism can be configured to concurrently take different modes of traffic into account (i.e., multi-modal traffic) such as passenger vehicles and pedestrians. Embodiments include a TPO tool that uses a model for optimizing deployment of TCAs to minimize a cost that includes network (e.g., roadway) delay costs and TCA costs. In addition, traffic link-level (roadway segment) queue dynamics (e.g., the number of vehicles waiting for a light at time "t") can be predicted by optimized TCA plans and signal plans.

Referring now to FIG. 1, a framework for special event planning that may be implemented by an embodiment is generally shown. In an embodiment, all or a portion of the framework may be implemented by a software application executing on a computer processor. The origin-destination estimation (ODE) block 102 can receive information about traffic volume 112, existing road closures and detours 114, link capacity 116, and background origin-destination (OD) path 118 (e.g., paths taken by traffic that travels the OD path on a typical day, does not take into account additional traffic caused by an event) for roadways within a roadway network of interest. In addition, SME knowledge from day-to-day event operations 110 can be input to the ODE block 102. The ODE block 104 can generate background link travel time data 120 (e.g., travel time on a segment of street) and background OD demand data 122 (e.g., number of trips from an origin to a destination). The ODE block 102 can be used to obtain a background OD trip matrix which describes how many trips will be generated from origins to destinations at a particular time(s) without taking into account additional demand caused by an event.

The responsive rerouting (RR) block 104 of FIG. 1 can receive information about event-based road closures 124, event-based turn restrictions 126 and event-based detours 128, as well as SME knowledge from day-to-day event operations 110 and outputs from the ODE block 102. The RR block 104 can generate an adjusted background OD path 130. Thus, given event-based control plans, such variable message sign (VMS) locations, road closures, turning restrictions and detours, the RR block 104 can find possible alternative routes for typical time-of-day traffic (e.g., background traffic that does not take events into account).

The event-based traffic assignment (ETA) block 106 of FIG. 1 can receive information about event OD estimation 132 (e.g., an event OD trip matrix which describes how many trips will be generated from origins to destinations at a particular time(s) due to the event), event OD demand 134 (e.g., number of trips from an event origin to an event destination), event OD path 136, and link capacity 138, as well as SME knowledge from day-to-day event operations 110 and outputs from the RR 104 block. The ETA block 106 can generate all path flow data 140 and turning ratios data 142. Thus, keeping the non-event path flow unchanged, the ETA block 106 can re-assign event traffic and affected time-of-day traffic which are estimated by event control plans. The ETA block 106 can then calculate and output turning ratio data 142 which describes expected paths at each intersection.

The traffic prediction and optimization (TPO) block 108 of FIG. 1 can receive information about road closures 124, time-of-day signal plans 144 (e.g., signal cycle settings) and TCA resources 146 (e.g., the number of TCAs available), as well as SME knowledge from day-to-day event operations 110 and outputs from the previous blocks. The TPO block 108 can generate link flow data 148 (e.g., traffic flow rate, number of vehicles per hour) and link density data 150 (e.g., number of vehicles per mile). Thus, the TPO block 108 can simulate traffic dynamics (also referred to herein as "traffic flow") given by the demand defined by a model generated by the previous blocks (e.g., the ODE block 102, the RR block 104, and the ETA block 106). In addition, the TPO block 108 can also perform signal plan optimization and TCA planning based on the simulated traffic dynamics.

Figure 2:
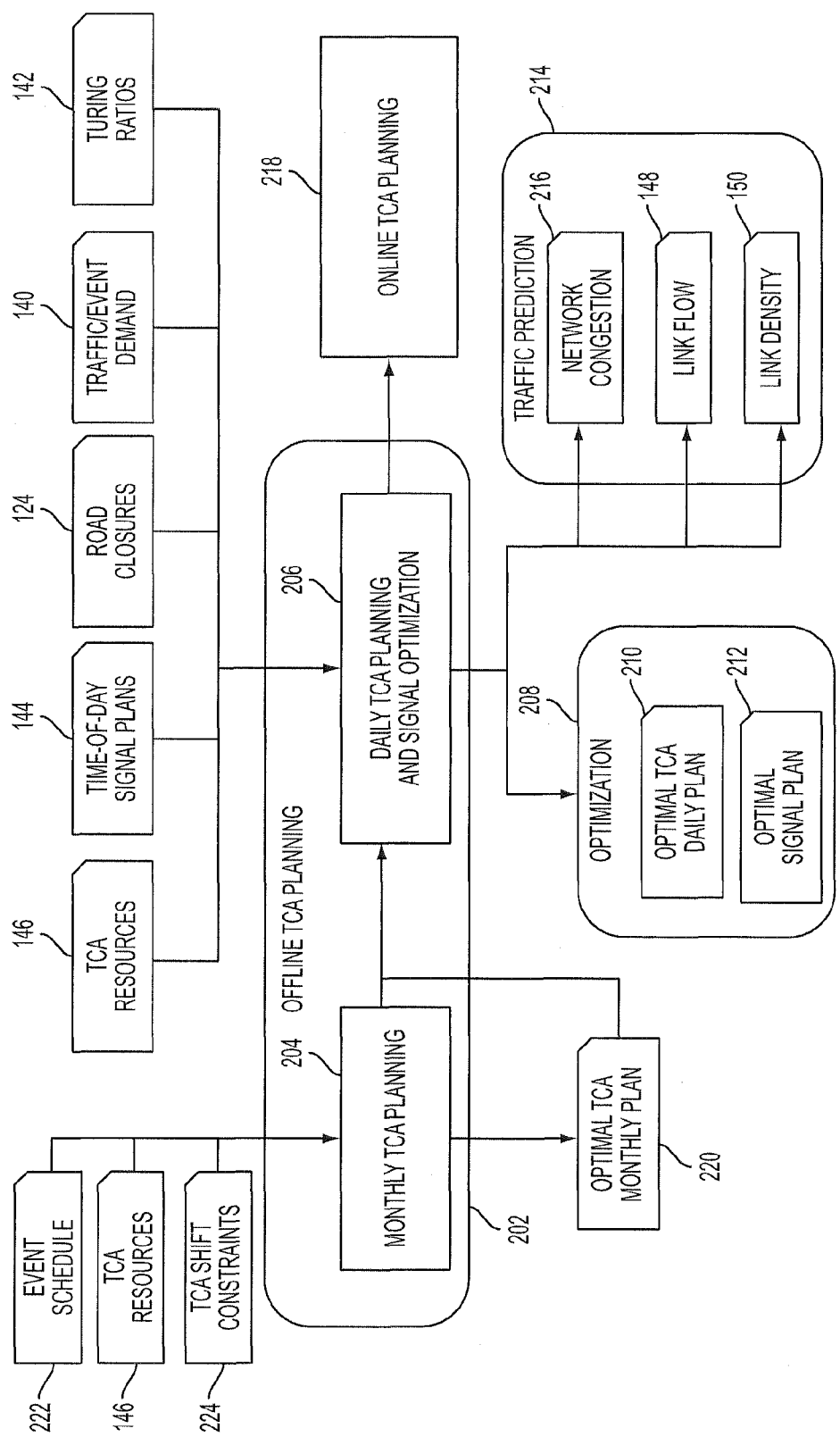
FIG. 2 depicts a block diagram of a process for traffic control agent (TCA) deployment and signal optimization that may be implemented by an embodiment.

FIG. 2 depicts a more detailed view of an embodiment of inputs and outputs of processes that can be performed by the TPO block 108 shown in FIG. 1. The TPO block 108 can be implemented by an embodiment of a TPO tool executing on a computer processor. In an embodiment, the TPO block 108 can simulate traffic dynamics based on a given demand. It can also perform TCA planning, including signal optimization for roadways within a transportation network of interest. The scope of the transportation network of interest may be modified, based on, for example, a location of an event. The TCA planning shown in FIG. 2 includes offline TCA planning 202 and online TCA planning 218. Offline TCA planning 202 can include monthly TCA planning 204 and daily TCA planning and signal optimization 206. Inputs to monthly TCA planning 204 can include an event schedule 222 (e.g., expected times for upcoming events), TCA resources 146, and TCA shift constraints 224 (e.g., maximum number of consecutive shifts, maximum number of shifts in a time period, etc.). The monthly TCA planning 204 includes logic to create a monthly plan for TCA placement. An output from the monthly TCA planning 204 can include an optimal TCA monthly plan 220. An embodiment of the TCA monthly plan 220 includes TCA event assignment, TCA location assignment, and TCA shift assignment.

Inputs to daily TCA planning and signal optimization 206 can include outputs from the monthly TCA planning 204 (e.g., the optimal TCA monthly and daily plan 220), TCA resources 146, time-of-day signal plans 144, road closures 124 (e.g., expected road closures for particular days/times), traffic/event demand 140 (e.g., taking into account traffic caused by the event), and turning ratios 142 (e.g., expected by the event traffic). The daily TCA planning and signal optimization 206 includes logic to simulate traffic dynamics. Assumptions and/or optimization parameters used by the TCA planning and signal optimization 206 can be varied to allow for different scenarios to be simulated. Examples of assumptions that may be varied include event traffic volume is known or can be estimated, and TCA's performance is identical to each other. Examples of optimization parameters that may be varied include different geometry of intersections, different signal plan configurations, and different event types.

Outputs from the daily TCA planning and signal optimization 206 can include traffic predictions 214 and optimized plans 208. The traffic prediction 214 simulates traffic dynamics (e.g., based on demand, TCA placement, traffic signal settings) and can include network congestion predictions 216 (e.g., predicting network flow rates and network density), link flow predictions 148 (e.g., predicting number of vehicles per hour in a link), and link density predictions 150 (e.g., predicting number of vehicles per mile in a link). Based on "what-if" analytics that can include changing a placement of one or more TCAs and traffic signal settings, different network congestion predictions 216, link flow predictions 148 and link density predictions may result. These can be assigned a cost and a model used to minimize the cost associated with the combination of TCA deployment and traffic delay (both pedestrian and vehicular). The output of the model, the optimized plans 208 can include an optimal TCA daily plan 210 (e.g., a schedule of TCA placement throughout the day) and an optimal signal plan 212 (e.g., a schedule of cycle times throughout the day for signals within the network).

Online TCA planning 218 can be used to adjust the settings of traffic signals (e.g., by a TCA) and/or the deployment of TCAs based on actual traffic patterns observed. These adjustments can be input to the model to improve future model predictions. Adjustments can also be made due to other factors such as fewer TCAs being available than planned for and/or an unplanned event that impacts traffic patterns or TCA availability.

Figure 3:
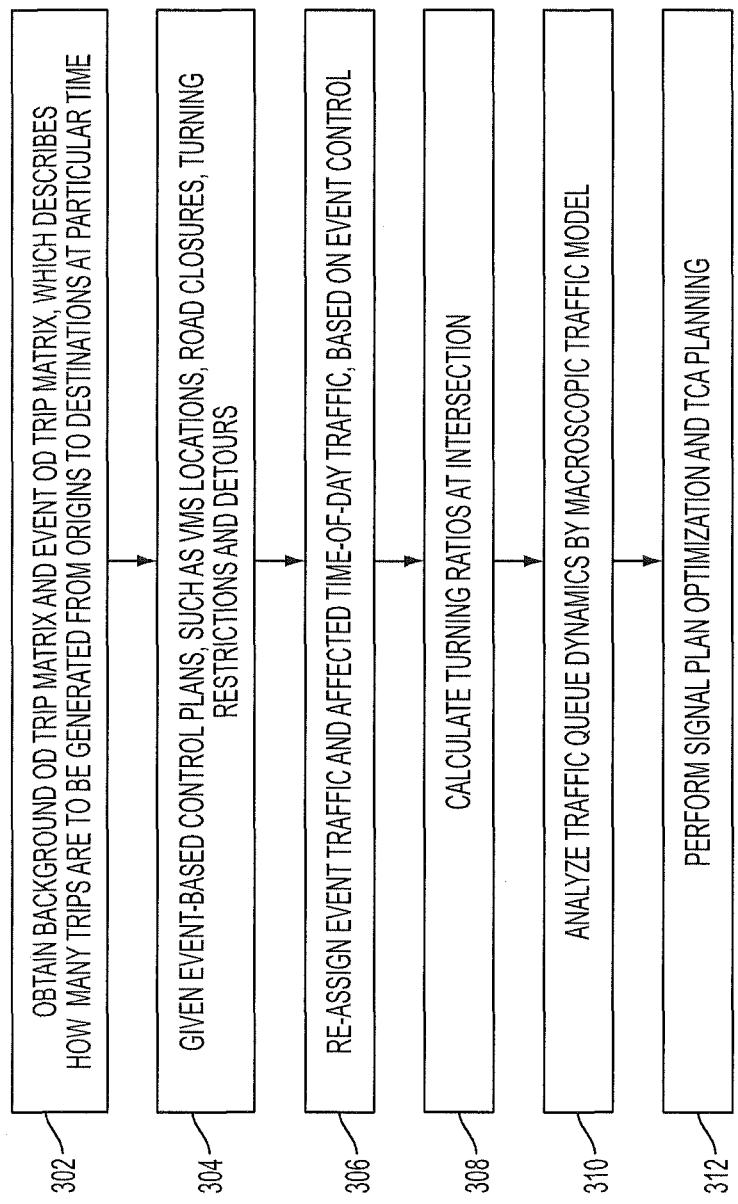
FIG. 3 depicts a flow diagram of a process for daily traffic control agency planning that may be implemented by an embodiment.

FIG. 3 depicts an embodiment of a process flow for performing daily TCA planning and signal optimization in accordance with an embodiment. At block 302, a background OD trip matrix and event OD trip matrix are obtained which describe an estimate of how many trips are to be generated from origins to destinations in the transportation network at a particular time(s). In an embodiment, a transportation network refers to a group of transportation network units, such as, but not limited to roads and sidewalks within a specified geographic location or within a distance of a specified geographic location. The network units can be made up of intersections and links (pathways between the intersections). At block 304, event-based control plans, such as, but not limited to, VMS locations, road closures 124, turning restrictions 126, and detours 128 can be obtained. At block 306, event traffic and affected time of day traffic can be re-assigned based on the event-based control plans obtained in block 304. At block 308, turning ratios can be calculated at the intersections within the transportation network. The turning ratio can includes an estimate of paths that will be taken by vehicles or pedestrians that are coming from an origin on the way to a destination. An example is an estimate of how many eastbound will turn left at a particular intersection.

At block 310, traffic queue dynamics can be analyzed by a traffic model to generate, for example, an estimate of the flow capacity (e.g., number of vehicles per hour on each link at a particular time) and a queue at each link at the particular time. At block 312, signal plan optimization and TCA planning are performed to determine placement of TCAs and settings for traffic signals. The optimization can be performed to minimize a cost associated with traffic delays and TCA deployment. The optimization can be within the constraints of a specified number of TCAs and a set number of traffic signals in the transportation network.

Figure 4:
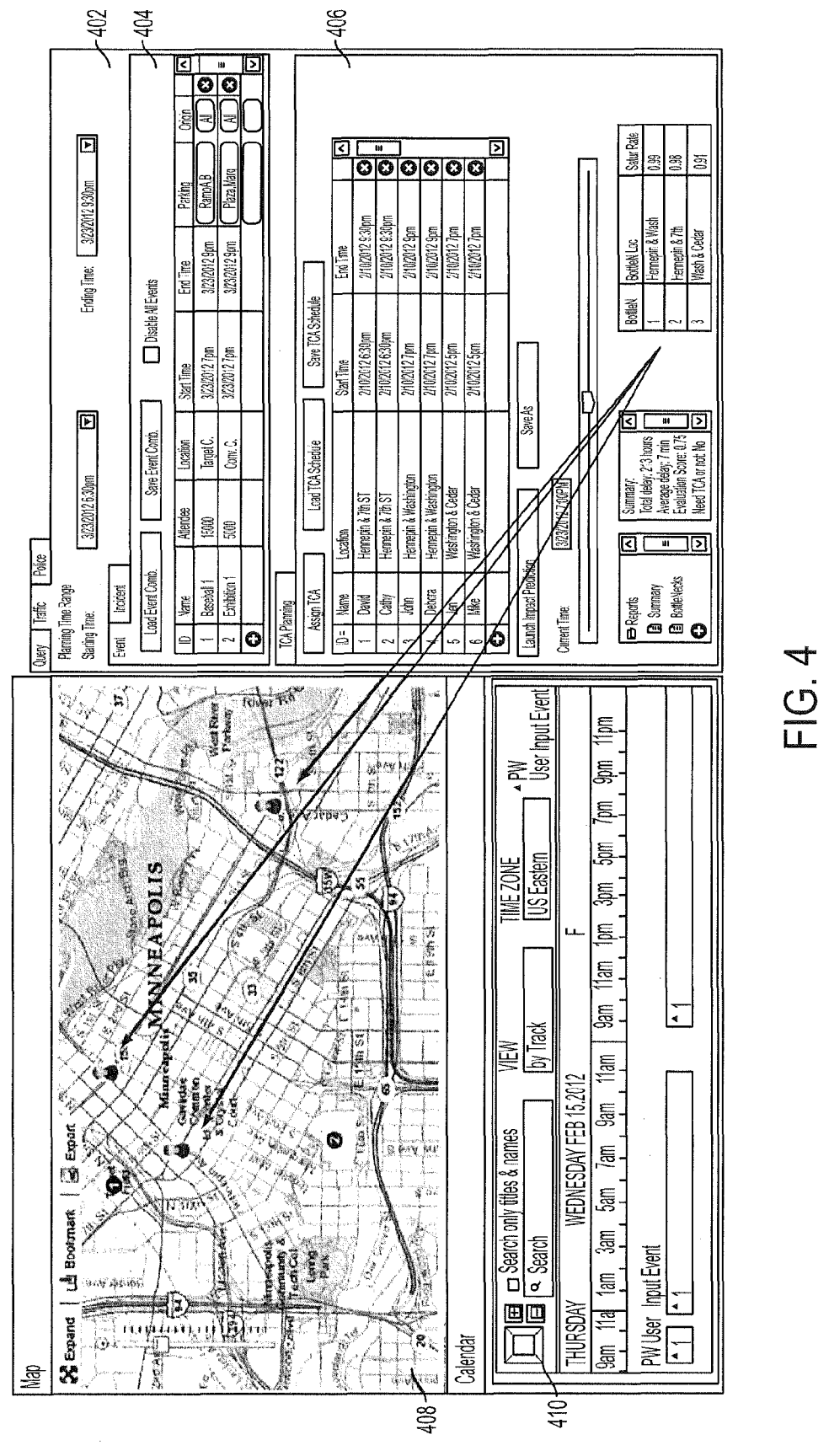

Turning now to FIG. 4, a sample user interface that may be implemented by an embodiment is generally shown. The user interface shown in FIG. 4 can be a screen interface that is generated by an embodiment of the TPO tool and displayed on a user device. The screen includes a planning time range section 402, an event section 404, a TCA planning section 406, a map section 408, and a calendar section 410 for a traffic resource control plan. In an embodiment, the calendar section 410 can allow a user to scroll to view traffic resource control plans for different calendar dates and times. In an embodiment, the map section 408 can display all or a portion of a transportation network that is included in the traffic control resource plan. The map section 408 shows the suggested placement of the TCAs. The TCA planning section 406 can include TCA data related to the plan output from the model. Though not shown in FIG. 4, a traffic control signal plan user interface screen can include traffic control signal related data. The event section 404 can include information about planned events. The planning time range section 402 can include information about the time frame that the plan relates to.

An embodiment of a model for performing signal plan optimization and TCA planning follows. Goals of embodiments of the model include minimizing a total cost which includes costs associated traffic and TCA deployment costs. Assumptions used by embodiments of the model include: demand is known; turning ratio is fixed and traffic rerouting is not allowed; and cycle length of traffic signals is fixed. In embodiments, the saturation flow of each link and the turning rates are assumed to be known and constant.

Sets Input and Used by an Embodiment of the Model Follow:

$n \in N$, the set of all nodes, where the road network is represented as a directed graph with links "i" and intersections "n";

$n \in N_c \subset N$, the set of nodes needed for signal optimization;

$i \in I$, the set of all vehicle links;

$m \in M$, the set of all pedestrian links;

$t \in T$, the set of all time steps;

$(i, n, j) \in K \equiv I \times N \times I$, the set of all turns, from link i, via node n, to link j;

$(i, n, j) \in K_c \equiv I \times N_c \times I$, the set of turns, located in the nodes needed for signal optimization;

$Z \in Z$, the set of vehicle signal stages, the signal control plan of an intersection n (or node n) may be based on a fixed number of vehicle stages;

$z \in Z'_{inj}$, the set of vehicle signal stages at node n, serving turn (i,n,j); and $p \in P$, the set of pedestrian signal phases.

Data Inputs to an Embodiment of the Model Follow:

$d_{it} \forall i \in I, t \in T$, traffic demand (vehicles/hour) on link i, at time step t;

$a_{ij} \forall i \in I, j \in I$, turning ratios from link j to link i, $a_{ij}$ is zero if there is no connection between links i and j.

$Q_{it} \forall i \in I, t \in T$, flow capacity (vehicles/hour) on link i, at time step t (obtained for example by link width, number of lanes and shoulder width);

$x_{0i} \forall i \in I$, initial queue (vehicle) on link i;

$x_{max,i} \forall i \in I$, storage capacity (vehicle) on link i;

$P_{mt} \forall m \in M, t \in T$, pedestrian capacity (pedestrians/hour) on link m, at time step t;

$\lambda_{mt} \forall m \in M, t \in T$, pedestrian arrival rate (pedestrians/hour) on link m, at time step t;

$y_{0m} \forall m \in M$; initial pedestrian queue (pedestrian) on link m;

$y_{max,m} \forall m \in M$, pedestrian storage capacity (pedestrian) on link m;

Δ, time step interval (e.g., hour, minute);

$\Omega_{inj}$ ∀(i, n, j)∈K\K$_c$, turning capacity (vehicles/hour) at turn (i,n,j);

$S_{inj}$ ∀(i, n, j)∈K$_c$, saturation flow rate (vehicles/hour) on turn (i,n,j), where saturation flow rate is the maximal allowable flow rate in a link;

$R_m$ ∀m∈M, saturation flow rate (pedestrians/hour) on pedestrian link m;

$G_{nz}$ ∀n∈N$_c$,z∈Z, background green time at node n and vehicle stage s, where background green time is offline pre-optimized green time and a vehicle stage s is a certain period of time in which the signal of one or several traffic movement is green (a stage could contain multiple compatible phases);

$G_{np}$ ∀n∈N$_c$, p∈P, background green time at node n and pedestrian phase p, where pedestrian phase p is a certain period of time in which the signal of one pedestrian movement is green;

GWalk$_{np}$ ∀n∈N, p∈P, the background green time for pedestrians to walk at node n and pedestrian phase p;

$D_{np}$ ∀n∈N$_c$, p∈P, don't walk green time for pedestrians at node n and pedestrian phase p;

$g_{nzt}^{min}$ ∀n∈N, z∈Z, t∈T, the minimal green time (seconds) at node n and vehicle stage s;

$g_{nzt}^{max}$ ∀n∈N, z∈Z, t∈T, the maximal green time (seconds) at node n and vehicle stage s;

$C_n$ ∀n∈N, cycle length (seconds) at node n;

T2S$_{turn}$, vehicle green stages matrix which represents a mapping from vehicle links to stages;

P2S$_{turn}$, pedestrian green phase matrix which represents a mapping from pedestrian links to stages;

L, lost time in a cycle which represents unused green time which no vehicles are able to pass through an intersection despite the traffic signal displaying a green (go) signal;

$A_{zp}$ ∀z∈Z, p∈P, relationship between vehicle stage z and pedestrian phase p, for example a given intersection may have west/east (WE) traffic signals and north/south (NS) traffic signals, the vehicle traffic signal can have four stages (turn WE, WE, turn NS, NS) and the pedestrian traffic signal can have two phases (walk WE, walk NS), the matrix $A_{zp}$ can be generated to reflect the relationships, for example, $A_{11}$=0 can reflect that when the vehicle stage is turn WE, pedestrian phase walk WE is not green, and $A_{21}$=1 can reflect that when the vehicle stage is WE, pedestrian phase walk WE is green;

$B_n$ ∀n∈N$_c$⊂N, the number of TCAs needed at node n;

$\tau^{min}$, the minimal number of time steps that a TCA needs to be working at an intersection;

$C_{init}$, initial cost for a TCA which can includes overhead costs such as vehicles, health insurance;

$C_{hr}$, hourly cost for a working TCA; and

W, is an integer that is used for constraint selections.

Decision Variables Used by an Embodiment of the Model Follow:

$x_{it}$ ∀i∈I,t∈T, queue on link i (e.g., the number of vehicles at road segment x), at time step t;

$u_{it}$ ∀i∈I,t∈T, outflow on link i, at time step t, this represents the number of vehicles that leave the link;

$y_{mt}$ ∀m∈M,t∈T, queue on link m (e.g., the number of pedestrians at sidewalk segment y), at time step t;

$S_{mt}$ ∀∈m∈M,t∈T, pedestrian outflow on link m, at time step t, this represents the number of pedestrians that leave the link;

$g_{nzt}$ ∀n∈N$_c$,z∈Z,t∈T, optimized green time at node n, vehicle stage z and time step t, where optimized green time refers to best green time obtained which serves the objective best;

$g_{npt}$ ∀n∈N$_c$,p∈P,t∈T, optimized green time at node n, pedestrian phase p and time step t;

gwalk$_{npt}$ ∀n∈N$_c$,p∈P,t∈T, the green-walking time for pedestrians at node n, phase p and time step t;

$\omega_{nt}$ ∀n∈N,t∈T, a binary decision variable, $\omega_{nt}$=1 when a TCA should be assigned to work at intersection n at time step t, otherwise $\omega_{nt}$=0, $B_{max}$ is a decision variable that represents the maximum (or total) number of TCAs that are needed in the network.

Objective:

The objective of an embodiment of the model is to minimize total delay and TCA deployment costs. The objective function can be expressed as:

$$\text{Minimize } \alpha \sum_t \sum_i x_{it} + \beta \sum_t \sum_m y_{mt} + C_{init} B_{max} + \sum_n \sum_t C_{hr} B_n \omega_{nt}$$

$$\sum_t \sum_i x_{it}$$

represents the total vehicle queue at link i, at time t.

$$\sum_t \sum_m y_{mt}$$

represents the total pedestrian queue at pedestrian link m, at time t.

$$C_{init} B_{max}$$

represents the total initial cost for TCAs.

$$\sum_n \sum_t C_{hr} B_n \omega_{nt}$$

represents the total duration cost for TCAs.

α and β are the coefficients to convert time (e.g., traffic delay) into United States (U.S.) dollars. α can be applied to determine the cost of a vehicle waiting and β can be applied to determine the cost of a pedestrian waiting. To translate travel delays into monetary values, the U.S. Department of Transportation (DOT) has used the following travel time values for evaluating transportation projects (1997 U.S. dollars): in-vehicle time at $8.90/person-hour; out-of-vehicle time (e.g., waiting for a bus at $17.00/person-hour; and commercial truck at $16.50/person-hour. An embodiment uses these same values adjusted for a consumer price index (CPI) inflation of 143.54% from 1997 to 2012.

In an embodiment, the objective function is subject to several constraints including: flow conservation constraints (vehicle and pedestrian), turning flow constraints (vehicle and pedestrian), signal plan constraints, and TCA planning constraints. Exemplary embodiments of these constraints follow.

Vehicle Flow Conservation Constraints.

These constraints reflect vehicle queue dynamics from one vehicle link to another. For example, the dynamics of a given vehicle link i may be expressed as the conservation equation below:

$$x_{i,t+1} = x_{it} + \left(\sum_j a_{ij}u_{jt} + d_{it} - u_{it}\right)\Delta \ \forall \ i \in I, t \in T$$

$$x_{i1} = x_{0i} \ \forall \ i \in I$$

$$0 \le x_{it} <= x_{maxi} \ \forall \ i \in I, t \in T$$

Pedestrian Flow Conservation Constraints.

These constraints reflect pedestrian queue dynamics from one pedestrian link to another. For example, the dynamics of a given pedestrian link m may be expressed as the conservation equation below:

$$y_{m,t+1} = y_{mt} + (\lambda_{mt} - s_{mt})\Delta \forall m \in M, t \in T$$

$$y_{m1} = Y_{0m} \forall m \in M$$

$$0 \le y_{mt} \le y_{max,m} \forall m \in M, t \in T$$

Vehicle Turning Flow Constraints.
Vehicle flow capacity is represented as:

$$0 \le u_{it} \le Q_{it} \forall i \in I, t \in T$$

Vehicle turning capacity is represented as:

$$a_{ji}u_{it} \le \Omega_{inj} \forall (i,n,j) \in K \backslash K_c, t \in T$$

In an embodiment, the vehicle saturation flow rate constraint is represented as two mutual exclusive constraints, when $\omega_{nt}$ is equal to 1, the first constraint is active to ensure vehicle flow rate is less than the maximal allowable flow limited by assigned green times. When $\omega_{nt}$ is equal to zero, the second constraint is active to ensure vehicle flow rate is less than the maximal allowable flow limited by offline pre-defined green times.

$$a_{ji}u_{it} \le S_{inj}\frac{\sum_z g_{nzt} * T2S_{turn}}{C_n} + (1-\omega_{nt})*W \ \forall \ (i, n, j) \in K_c, t \in T$$

$$a_{ji}u_{it} \le S_{inj}\frac{\sum_z G_{nz} * T2S_{turn}}{C_n} + \omega_{nt}*W \ \forall \ (i, n, j) \in K_c, t \in T$$

Pedestrian Flow Constraints.
Pedestrian flow capacity is represented as:

$$0 \le s_{mt} \le P_{mt} \forall m \in M, t \in T$$

Pedestrian saturation flow rate constraint is represented as two mutual exclusive constraints. When $\omega_{nt}$ is equal to 1, the first constraint is active to ensure pedestrian flow rate is less than the maximal allowable flow limited by assigned green times. When $\omega_{nt}$ is equal to zero, the second constraint is active to ensure pedestrian flow rate is less than the maximal allowable flow limited by offline pre-defined green times.

$$s_{mt} \le R_m \frac{\sum_p gwalk_{np} * P2S_{turn}}{C_n} + (1-\omega_{nt})*W \ \forall \ (i, n, j) \in K_c, t \in T$$

$$s_{mt} \le R_m \frac{\sum_p Gwalk_{npt} * P2S_{turn}}{C_n} + \omega_{nt}*W \ \forall \ (i, n, j) \in K_c, t \in T$$

Signal Plan Constraints.
An embodiment of modeling traffic signals for an optimized signal includes, by definition, that the constraint:

$$\sum_z g_{nzt} + L = C_n \ \forall \ n \in N_c, t \in T$$

holds at each intersection n, where $g_{nzt}$ is the optimized green time of stage z at node n at time step t; and $C_n$ is the cycle length at node n.

In addition:

$$g_{nz}^{min} \le g_{nzt} \le g_{nz}^{max} \forall n \in N_c, z \in Z, t \in T$$

where $g_{nz}^{min}$ and $g_{nz}^{max}$ are the minimum and maximum permissible green time for stage z at node n, respectively.

Further:

$$G_{np} = G_{nz} \cdot A_{zp} \forall n \in N_c, z \in Z, p \in P$$

$$Gwalk_{np} = G_{np} - D_{np} \forall n \in N_c, p \in P$$

$$g_{npt} = g_{nzt} \cdot A_{zp} \forall n \in N_c, z \in Z, p \in P, t \in T$$

$$gwalk_{npt} = g_{npt} - D_{np} \forall n \in N_c, p \in P, t \in T$$

TCA Planning Constraints.
TCA planning constraints can be relaxed in the first stage, which you can understand the best number of TCA needed and how should you assign them in each location and time slots without considering logistics or other constraints of TCAs.

Satisfy minimum working time:

$$\sum_{k=t}^{t+\tau_{min}} |\omega_{nk} - \omega_{n,k-1}| \le 1 \ \forall \ t, n \in N$$

Maximal TCA needed at each time step:

$$\sum_n B_n \omega_{nt} \le B_{max} \ \forall \ t \in T$$

Figure 5:
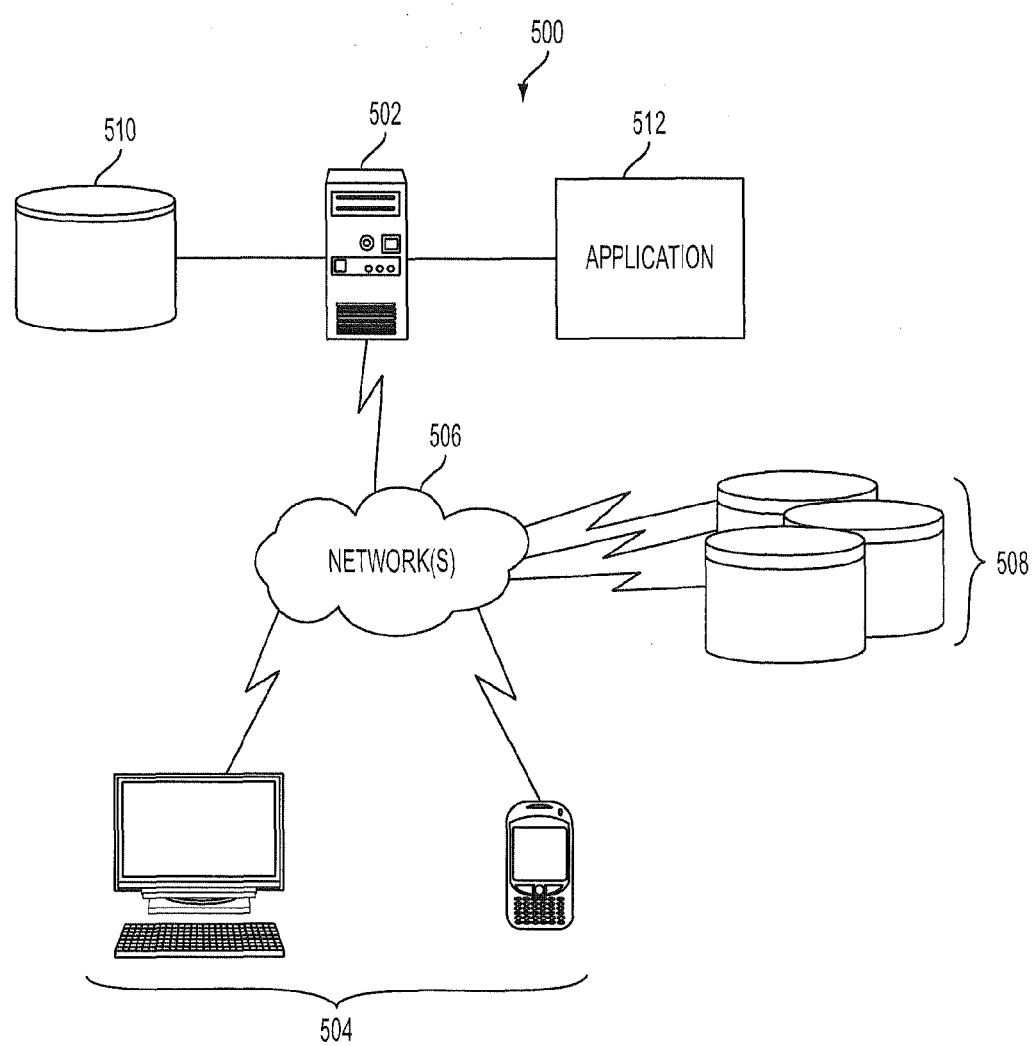
FIG. 5 depicts a system upon which TCA deployment and signal optimization for event planning may be implemented in accordance with an embodiment.

Turning now to FIG. 5, a system 500 upon which a TPO tool may be implemented in an embodiment will now be described.

The system 500 includes a host system computer 502 and communication devices 504 communicatively coupled to one or more network(s) 506. The host system computer 502 may be implemented as one or more high-speed computer processing devices, such as one or more mainframe computers or servers capable of handling a high volume of computing activities conducted by end users of the social interaction facilitation tool. The host system computer 502 may operate as a database server and coordinate access to application data including data stored on a storage device 510. The storage device 510 may be implemented using memory contained in the host system computer 502 or may be a separate physical device. In an embodiment, the storage device 510 stores data associated with the multi-level framework for TCA planning, such as data associated with the optimization 208 and traffic prediction 214 shown in FIG. 2.

The host system computer 502 may be implemented using one or more servers operating in response to a computer program stored in a storage medium accessible by the server. The host system computer 502 may also operate as a network server (e.g., a web server) to communicate with the communications devices 504, as well as any other network entities. In an embodiment, the host system computer 502 may represent a node in a cloud computing environment or may be configured to operate in a client/server architecture.

The communications devices 504 may be any type of devices with computer processing capabilities. For example, the communications devices 504 may include a combination of general-purpose computers (e.g., desktop, lap top), host-attached terminals (e.g., thin clients), and portable communication devices (e.g., smart phones, personal digital assistants, and tablet PCs). The communications devices 504 may be wired or wireless devices. In an embodiment, the communications devices 504 may represent cloud consumers in a cloud computing environment.

In an embodiment, the communications devices 504 may be implemented by end users of a website or web service hosted by an entity or enterprise operating the host system computer 502. The communications devices 504 may each execute a web browser for accessing network entities, such as the host system computer 502. In an embodiment, the communications devices 504 access a web site of the host system computer 502 for browsing and accessing an application 512. The application 512 implements the TPO tool and any other processes described herein.

The network(s) 506 may be any type of known networks including, but not limited to, a wide area network (WAN), a local area network (LAN), a global network (e.g. Internet), a virtual private network (VPN), and an intranet. The network(s) 506 may be implemented using a wireless network or any kind of physical network implementation known in the art, e.g., using cellular, satellite, and/or terrestrial network technologies.

The system 500 also includes storage devices 508 communicatively coupled to the host system computer 502. The storage devices 508 may be logically addressable as consolidated data sources across a distributed environment that includes a network (e.g., network(s) 506). In an embodiment, the storage devices 508, as well as the storage device 510, represent the data sources used by embodiments of the TPO tool. The storage devices 508 can store, along with or in place of storage device 510, data associated with the multi-level framework for TCA planning.

Technical effects and benefits include providing assistance to event traffic operators to optimize deployment of traffic control agency resources to mitigate traffic congestion caused by events. Embodiments can include a multiple level planning mechanism, including monthly, daily and online planning. Embodiments can also include the ability to concurrently take multi-modal traffic into account, including both passenger vehicles and pedestrians. In addition, an analytical model can be provided to optimize deployment of traffic control agency to minimize total network delay. Still further traffic link-level queue dynamics can be predicted for optimized TCA deployment plans and traffic signal plans.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for traffic control resource planning, the system comprising:
   a memory having computer readable computer instructions; and
   a processor for executing the computer readable instructions to perform a method comprising:
   receiving information about available routes in a transportation network;
   receiving an estimate of a traffic demand in the transportation network; and
   performing traffic control planning, the performing including:
      simulating a traffic flow based on the available routes and the traffic demand;
      applying a model that varies traffic control agent (TCA) placement and traffic signal settings in the transportation network to minimize a cost associated with the traffic flow, the cost including a TCA deployment cost and a traffic delay cost;
   outputting a traffic control plan based on the applying, the traffic control plan including a TCA placement and traffic signal setting plan;
   monitoring, via a camera, an actual traffic flow on one or more of the available routes; and
   updating the traffic control plan based on the monitoring.

2. The system of claim 1, wherein the traffic demand is determined based on a planned event.

3. The system of claim 1, wherein the traffic demand is determined based on an unplanned event.

4. The system of claim 1, wherein the traffic flow includes vehicular traffic and pedestrian traffic.

5. The system of claim 1, wherein the transportation network includes vehicular roadways and pedestrian roadways.

6. The system of claim 1, wherein a number of TCAs available for TCA placement is fixed.

7. The system of claim 1, wherein the TCA placement takes into account TCA shift constraints.

8. The system of claim 1, wherein the model is further applied to quantitatively predict a difference in the cost between the traffic control plan and a second traffic control plan.

9. The system of claim 1, further comprising implementing the traffic control plan.

10. The system of claim 9, further comprising updating the model based on an actual traffic flow observed after the implementing.

* * * * *